United States Patent [19]

Uejima

[11] Patent Number: 4,682,315
[45] Date of Patent: Jul. 21, 1987

[54] FOCUSSING ERROR DETECTION DEVICE FOR USE IN OPTICAL DISK TYPE RECORDING SYSTEM

[75] Inventor: Atsushi Uejima, Kanagawa, Japan

[73] Assignee: Fuji Photo Film Co., Ltd., Japan

[21] Appl. No.: 744,921

[22] Filed: Jun. 14, 1985

[30] Foreign Application Priority Data

Jun. 22, 1984 [JP] Japan ................... 59-127323

[51] Int. Cl.⁴ .............................................. G11B 7/09
[52] U.S. Cl. .................................. 369/45; 369/46; 369/110; 250/201
[58] Field of Search ................ 369/44, 45, 46, 110, 369/118, 111; 250/201

[56] References Cited

U.S. PATENT DOCUMENTS

| | | | |
|---|---|---|---|
| 4,152,586 | 5/1979 | Elliott | 250/201 |
| 4,504,938 | 3/1985 | Tajima | 369/45 |
| 4,546,463 | 10/1985 | Ophey | 369/45 |

FOREIGN PATENT DOCUMENTS 125545 9/1980 Japan ...................... 369/46

*Primary Examiner*—Alan Faber
*Attorney, Agent, or Firm*—Laff, Whitesel, Conte & Saret

[57] ABSTRACT

A focussing error detection device for use in a optical disk type recording system wherein a light beam is converged by objective lens means onto a recording surface of the disk and wherein the light beam reflected by said recording surface is divided by a first beam divider interposed between said objective lens means and a light beam source. The improvement comprises a second beam divider for further dividing the light beam divided by said first beam divider into central light beam fraction and a peripheral light beam fraction, a first photo detector for detecting the quantity of the central light beam fraction, a second photo detector for detecting the quantity of the peripheral light beam fraction, and a subtracter for indicating the difference between the output from the first photo detector and the second photo detector.

8 Claims, 5 Drawing Figures

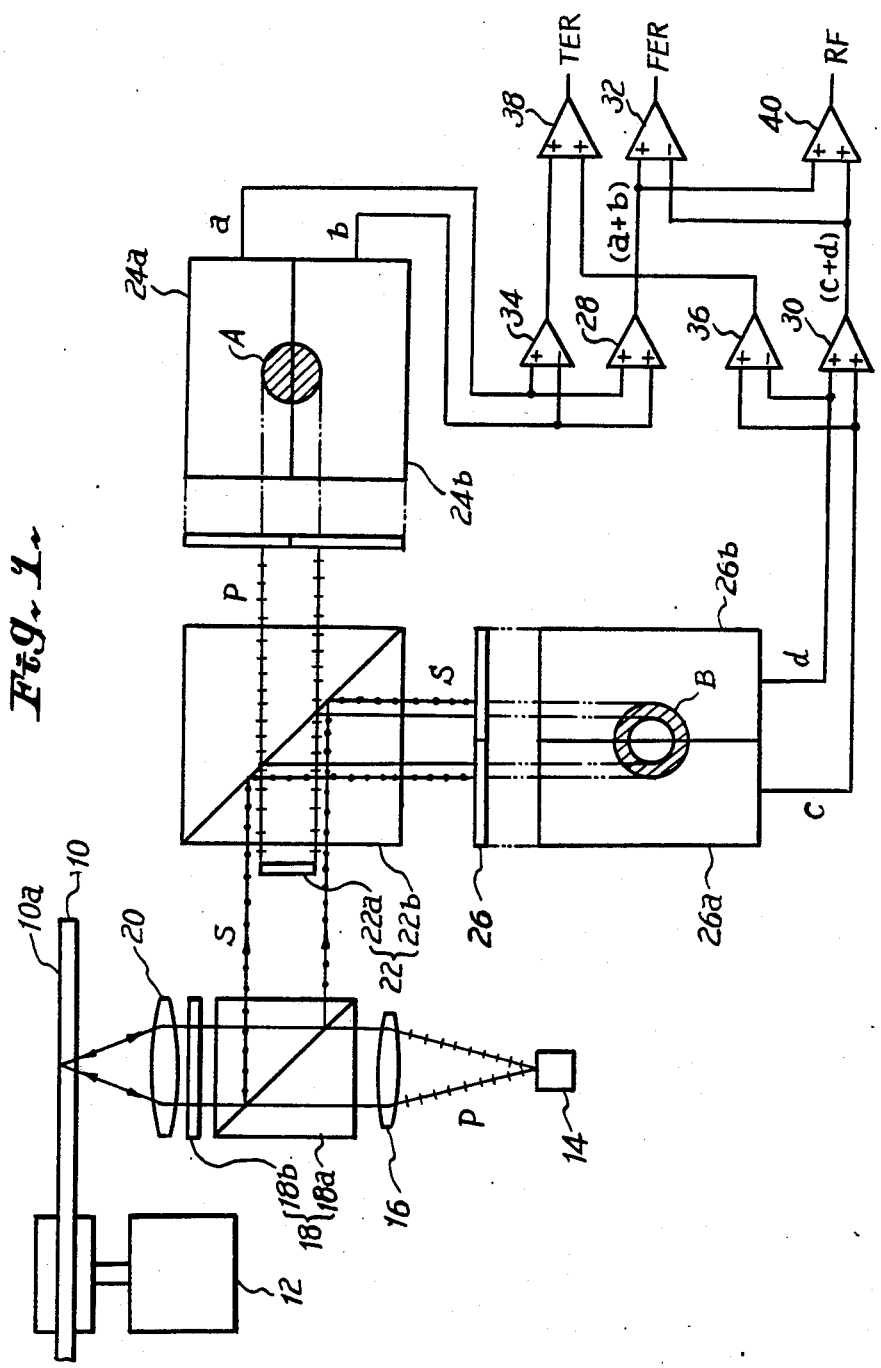

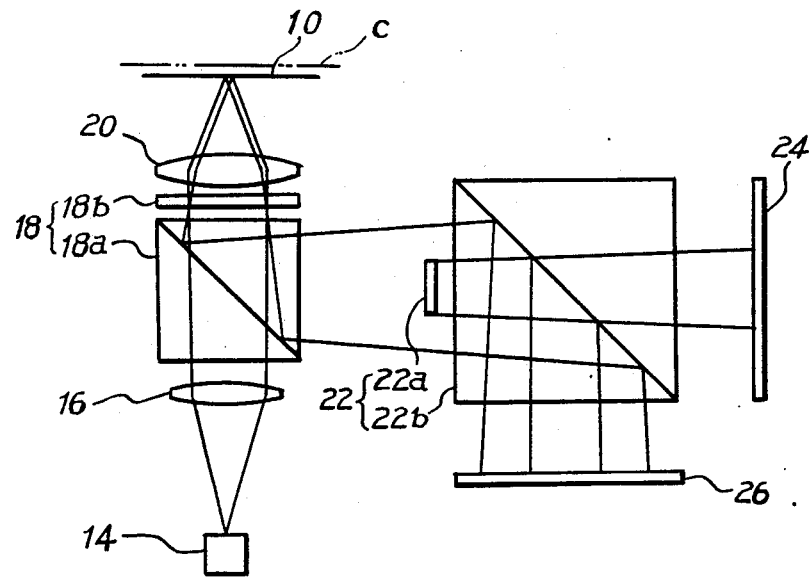
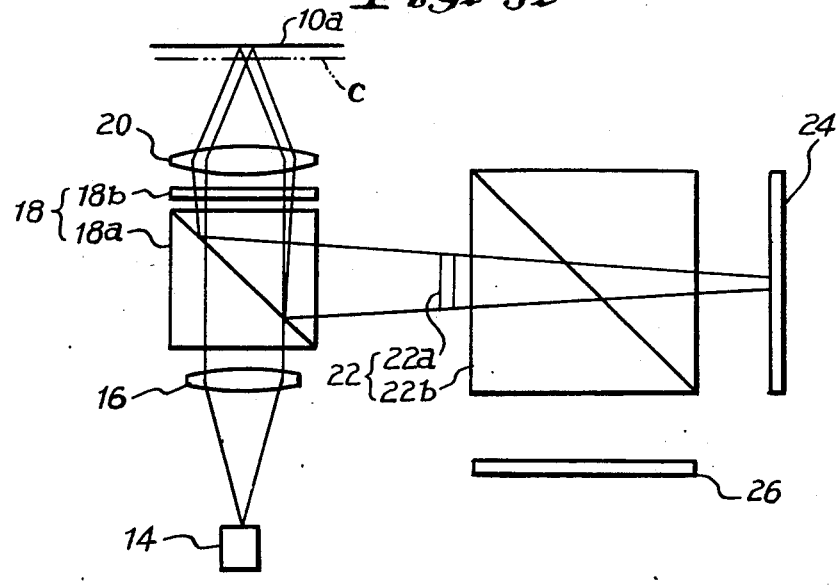

FOCUSSING ERROR DETECTION DEVICE FOR USE IN OPTICAL DISK TYPE RECORDING SYSTEM

BACKGROUND OF THE INVENTION

1. Field of Art

The present invention relates to a optical disk type recording system wherein informations are written in a recording surface of a optical disk by means of focussed light beams and the informations are read out by means of light beams reflected by the recording surface of the disk. More particularly, it relates to an improved focussing error detection device for use in such a optical disk type recording system.

2. Prior Art

There have been known a optical disk recording system wherein pits are formed by focussing a light beam, such as a laser beam, on a recording surface of a optical disk to write the informations in the disk, a optical disk reproducing system for reading out the information by means of reflected light beams from the recording surface or the surface on which the informations have been written, and a optical disk recording-and-reproducing system for writing-in and for reading-out the informations. In such a system, the area of the recording surface impinged by the light beam becomes too large to result in failure to secure stable recording and reproducing operations, unless the light beam is precisely focussed on the recording surface.

In order to secure the stable operations, focus servo means is indispensable to detect the error in the distance between the recording surface and the objective lens means continuously to determine the focussing error (hereinafter referred to as FER) and to maintain the distance from the recording surface to the objective lens means at a constant distance.

The known methods for detecting the FER include the method utilizing the astigmatic aberration, the Foucault's method and the critical angle method. In the method utilizing the astigmatic aberration, a cylindrical lens is used to differentiate the longitudinal focal length along the transverse direction of the reflected light and the FER is detected by the change in output of the quarterly splitted light detector disposed in the vicinity of the focal plane. In the Foucault's method, a prism is disposed such that one edge thereof extends along the focal plane of the reflected light to split the reflected light into two light beams and the difference in outputs between two sets of dually splitted photo detectors for detecting the dislocations of respective divided light beams is compared to determine the FER. In the critical angle method, the change in intensity distribution of the reflected light upon reflection by the critical angle prism is detected by a dually splitted photo detector to determine the FER, while making use of the phenomenon that the light reflected by the recording surface forms either of the diverging beam or converging beam upon passage through an objective lens depending on the change in distance between the recording surface of the disk and the objective lens.

As described above, in all of the known methods, photo detectors for detecting quarterly or dually splitted light beams are used and the focussing errors are determined by detecting the difference between the outputs of the light detecting elements of each photo detector. However, such a quarterly or dually splitted photo detector has inevitably an insensitive zone so that it cannot detect the difference whithin an region of the recording surface corresponding to the insensitive zone. As a result, the sensitivity of detection by the use of such a detector cannot be improved over a limited level.

Another disadvantages of the known methods are that the photo detectors and the prism must be positioned precisely to necessitate cumbersome adjustment in positioning. Moreover, in the method utilizing the astigmatic aberration and in the Foucault's method, the light reflected by the recording surface must be converged to result in that a certain space is occupied for the light path of the converging light to limit the free utilization of the space.

OBJECTS AND SUMMARY OF THE INVENTION

A primary object of this invention is to provide a focussing error detection device for use in a optical disk type recording system in which there is no need of using a light detector having dually splitted light receiving faces.

Another object of this invention is to provide a focussing error detection device for use in optical disk type recording system in which a photo detector having dually splitted light receiving faces is used in such a way that the accuracy of focussing error detection is not significanly affected by the insensitive zone formed by the provision of splitting line.

A further object of this invention is to provide a focussing error detection device for use in optical disk type recording system in which the optical elements, such photo detectors, are easily adjustable and the space in the system can be freely and efficiently utilized.

To attain the aforementioned objects, the present invention provides a device for detecting the light quantity of the central light beam fraction within a constant area of the reflected light and the light quantity of the peripheral light beam fraction outside of the constant area of the reflected light followed by comparing the former to the latter to determine the light quantity ration, whereby the dislocation of the recording surface is detected depending on the change in the diverging or converging light beam of the reflected light.

More specifically, according to the present invention, in the focussing error detection device for use in a optical disk type recording system wherein a light beam is converged by objective lens means onto a recording surface of the disk and wherein the light beam reflected by the recording surface is divided and detected by a first beam divider interposed between the objective lens means and light beam source, an improved focussing error detection device which comprises a second beam divider for further dividing the light beam divided by the first beam divider into a central light beam fraction and a peripheral light beam fraction, a first photo detector for detecting the quantity of the central light beam fraction, a second photo detector for detecting the quantity of the peripheral light beam fraction, and a subtracter for indication the difference between the output from the first photo detector and the second photo detector is provided.

DESCRIPTION OF THE APPENDED DRAWINGS

The above and other objects and characteristic features of the invention will become apparent from the following detailed description of the invention with reference to the appended drawings in which:

FIG. 1 is a diagrammatical illustration showing one embodiment of the invention;

FIG. 2 is a diagrammatical illustration showing the device of the invention and the recording surface dislocated from the focal plane at a position closer to the objective lens of the device;

FIG. 3 is a diagrammatical illustration showing the device of the invention and the recording surface dislocated from the focal plane at a position remoter from the objective lens of the device;

DESCRIPTION OF THE PREFERRED EMBODIMENTS

Figure 4:
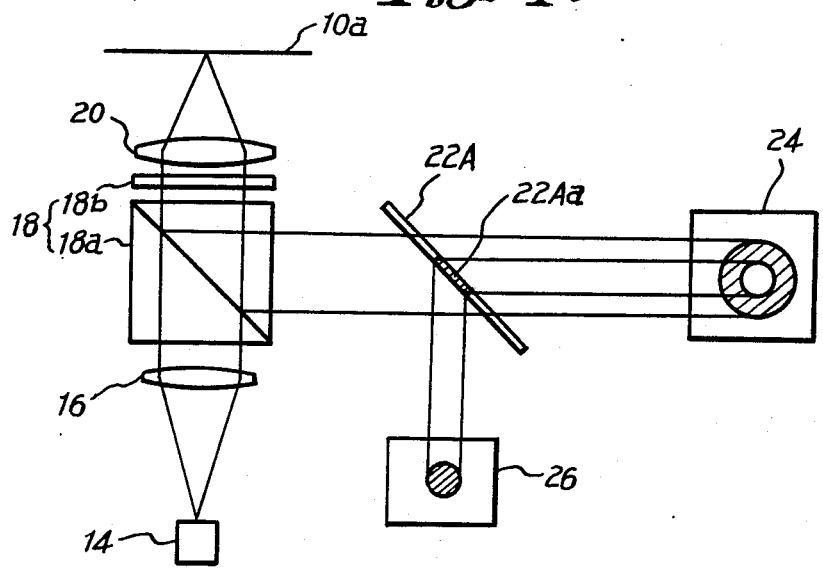
FIG. 4 is a diagrammatical illustration showing another embodiment of the invention.

Presently preferred embodiments of this invention will now be described in detail with reference to the appended drawings.

Initially referring to FIG. 1 showing a first embodiment of this invention, a portion of a optical disk is shown by reference numeral 10 and includes a substrate having one surface formed with a recording layer coated by a protection layer. Such a optical disk has been known in the art and the construction of the optical disk per se is not the subject matter of the present invention, and hence will not be described in detail herein. Informations are stored in the recording layer as a great number of pits and the thus stored informations are read out through a light beam reflected by the recording surface 10a. The optical disk 10 is rotated at a predetermined speed by means of a drive motor 12.

Reference numeral 14 designates a light beam source, and a laser beam source, such as a laser diode, for emitting a linearly polarized laser beam is used in this embodiment. The laser beam emitted from the light source 14 is changed to a parallel light beam by a collimeter lens 16. The parallel light beam is passed into a first light divider 18 which includes a polarization beam splitter 18a and a quarter wave plate (hereinafter referred to as λ/4 plate) 18b. Throughout the specification, "λ" means the wavelength of the light beam. An objective lens 20 is interposed between the recording surface 10a and the first light divider 18. The aforementioned light source 14 is attached so that the light beam forms a P-polarlized light having its vibration plane on the sheet surface.

The P-polarlized light beam emitted from the light source 14 passes through the polarlization beam splitter 18a to be converted into a circularly polarlized light beam by the λ/4 plate 18b, and then passed through the objective lens 20 to be converged to be directed towards the recording surface 10a. And the light beam is reflected by the recording surface 10a having its polarlized rotaton direction reversed upon reflection to be returned back onto the λ/4 plate 18b conversely along the path of incidence while forming a circularly polarlized light beam. Then, the light beam passes through the λ/4 plate 18b to be converted into a linearly polarized light beam to form an S-polarlized light beam havinga its vibration plane shifted by 90 degrees upon passage through the λ/4 plate 18b. Thus, the reflected light beam is reflected by the polarization beam splitter 18a.

A second light divider 22 is incorporated in the system, according to the present invention, to divide the light beam reflected by the first light divider 18 into a central light beam fraction and a peripheral light beam fraction, and includes a half wave plate (hereinafter referred to as λ/2 plate) 22a and a polarlization beam splitter 22b. The λ/2 plate 22a has a cicular configuration only to pass therethrough the central light beam fraction of the reflected light.

As a result, the central light fraction of the reflected light composed of an S-polarlized light beam is shifted in its phase by λ/2 by the λ/2 plate 22a to be converted into a P-polarlized light beam, and then passes through the polarlization beam splitter 22b. On the other hand, the peripheral fraction of the reflected light beam does not pass through the λ/2 plate 22a and is reflected by the polarlization beam splitter 22b to be separated from the central light beam fraction. The light beam reflected by the recording surface 10a is thus separated into two light beams by the second light divider 22. The intensities of the thus divided two light beams are detected by photo detectors 24 and 26. Meanwhile, in this embodiment, each of the photo detectors 24 and 26 is composed of a dually splitted photo detector for reading out the TER (tracking error) and simultaneously for reading out the read-out signal (hereinafter referred to as RF signal) from the corresponding pit on the recording surface 10a. A simple photo detector without having any slit line may be used if it is intended to detect only the FER signal.

In FIG. 1, the front views of the detectors 24 and 26 when viewed from the side of the polarlization beam splitter 22b are shown in addition to the side views thereof. As shown by letters A and B in the Figure, the light beam passing through the λ/2 plate 22a projects on the photo detector 24 as a circular projection, and the peripheral fraction of light beam reflected by the λ/2 plate 22a projects on the photo detector 26 as an annular projection. The outputs a and b from the dectecting elements 24a and 24b of the photo detector 24 are added in an adder 28. Likewise, the outputs c and d from the detecting elements 26a and 26d of the photo dectector 26 are added in an adder 30. The difference between the outputs (a+d) and (c+d) from the adders 28 and 30 is calculated by a subtracter 32 so that the output from the subtracter 32, i.e. (a+b)−(c+d), is put out as the FER signal indicating the focussing error value.

The FER signal is set to zero under the condition shown in FIG. 1 where the recording surface 10a is positioned on the focal plane of the objective lense 20. In this embodiment, the FER signal may be readily adjusted to zero simply by setting the rotational angle of the λ/2 plate 22a to a pertinent angle to change the ratio between the outputs from the two photo detectors 24 and 26. Alternatively, the zero setting of the FER signal may be effected by controlling the dimensions of the λ/2 plate 22a. The λ/2 plate 22a may be in any desired shape other than the circular contour shown in FIG. 1. Furthermore, a λ/2 plate is disposed to receive only the peripheral fraction of the reflected light so that the central fraction of the light beam reflected by the recording surface and composed of an S-polarlized light is converted into a P-polarlized light and the peripheral fraction is passed to the polarlization beam splitter 22b in the form of an S-polarlized light.

Referring now to FIG. 2, if the recording surface 10a is dislocated from the focal plane C of the objective lens 20 and positioned closer to the lens 20, the light beam reflected by the recording surface 10a becomes a diverging light beam. As a result, the ratio of the light quantity detected by the photo detector 26 relative to that detected by the photo detector 24 is increased, whereby a negative FER signal is put out. As the amount of dislocation of the recording surface 10a from the focal plane C of the objective lens 20 is increased, the absolute value of the negative FER signal increases.

On the contrary, if the recording surface 10a is positioned remoter from the focal plane C of the objective lens 20, as shown in FIG. 3, a positive FER signal is put out, with the absolute value thereof being increased as the increase in amount of dislocation of the recording surface 10a from the focal plane C of the objective lens 20.

The objective lens 20 may be moved in the direction perpendicular to the recording surface 10a by a focus servo mechanism (not shown) so that the FER signal may be set to zero.

The images of each pit on the recording surface 10a appear on the splitted segments of respective photo detectors 24 and 26. Accordingly, if the pit is moved in the left side from the focus of the objective lens when viewed in FIG. 1, the image thereof moves to the detecting elements 24b and 26b. The outputs of the subtracters 34, 36 for calculating the difference in outputs (a−b) from the detecting elements 24a and 24b and the difference in outputs (c−d) from the detecting elements 26a and 26b take, thus, positive values, and the sum of these outputs (a−b)+(c−d) it utilizable as a TER signal indicating the tracking error.

The sum of the outputs from all of the detecting elements b24a, 24b, 26a, and 26b are calculated by another adder 40, and the output (a+b)+(c+d) from the adder 40 is an RF signal for reading out the information from the corresponding pit.

Another embodiment of the invention is diagrammatically shown in FIG. 4, wherein a second light divider 22A has a circular center reflector region 22Aa and the residual portion transparent to lights. The light reflected by the recording surface may be divided into a central light beam fraction and a peripheral light beam fraction using such a reflector. Alternatively, the reflector may have a transparent center region and the residual portion composed of reflecting face. In FIG. 1, the parts denoted by the same reference numerals as used in FIG. 1 exert the same functions as those shown in FIG. 1, and the explanations thereof will not be repeated for simplification of the description.

Figure 5:
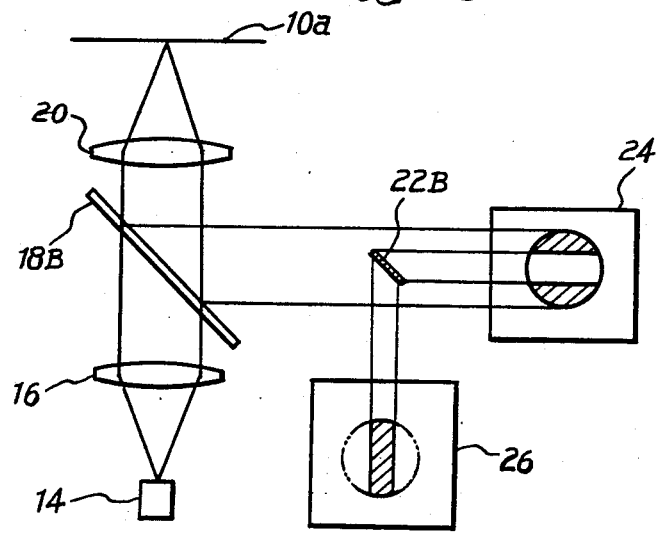
FIG. 5 is a diagrammatical illustration showing a further embodiment of the invention.

FIG. 5 is a diagrammatical illustration of a further embodiment of the present invention, wherein a first beam divider 18B is a half mirror (semi-transparent mirror) and a second beam divider 22B is a strip-shaped reflector disposed to traverse the central region of the light beam reflected by the recording surface and divided by the first beam divider 18B. The light beam reflected by the recording surface and divided by the first beam divider 18B is thus divided into a first light beam fraction reflected by the strip-shaped reflector 22B and a second beam fraction in the residual region.

As has been described hereinbefore, in the device of the present invention, the first light divider does not geometrically split the light beam reflected by the recording surface but does pick up all or a portion thereof, whereas the second light divider splits the light beam geometrically, for instance, into a central fraction and a peripheral fraction. It is not essential that the geometrical splitting or division by the second light divider be complete, but the essential feature is that two light beam fractions which are included in clearly different geometrical regions of distribution areas should be picked up separately.

In the device of the invention, the light beam reflected by the recording surface is divided into a central light beam fraction and the peripheral light beam fraciton, and the focussing error is detected by the change in difference between the quantities of the thus divided light beam fractions. Accordingly, the accuracy of the focus servo is not affected by the insensitive zone at the vicinity of the split line when a non-splitted type photo detector is used. Even if a splitted type photo detector is used, the sum of outputs from the light detecting elements is used to obviate significant affection by the insensitive zone thereby to ensure high accuracy of the focus servo. Since the photo detectors are disposed merely for the purpose of detecting the light quantities of the divided light beams, precise position adjustment of the optical elements is not necessitated so that the photo detectors and related instruments may be arranged at any desired positions. Accordingly, the space in and neighbourhood of the device may be freely used to design the total system in the most efficient and convenient manner.

What is claimed is:

1. A focussing error detection device for use in an optical disk type recording system wherein a light beam is converged by objective lens means onto a recording surface of a disk and wherein the light beam reflected by said recording surface is divided by a first beam divided interposed between said objective lens means and a light beam source, said detection device comprising a focussing error detection device which comprises a second beam divider for further dividing the light beam divided by said first beam divider into a central light beam fraction and a peripheral light beam fraction, a first photo detector for detecting the quantity of the central light beam fraction, a second photo detector for detecting the quantity of the peripheral light beam fraction, and a subtracter for indicating the difference between the output from the first photo detector and the second photo detector.

2. The focussing error detection device according to claim 1, wherein said light beam source is a laser beam source.

3. The focussing error detection device according to claim 2, wherein said laser beam source is a laser diode which emits a linearly polarlized laser beam.

4. The focussing error detection device according to claim 1, wherein said second beam divider comprises a polarization beam splitter, and a half wave plate interposed between said polarization beam splitter and said first beam divider for polarizing the central light beam fraction.

5. The focussing error detection device according to claim 1, wherein said second beam divider comprises a polarization beam splitter, and a half wave plate interposed between said polarization beam splitter and said first beam divider for polarizing the peripheral light beam fraction.

6. The focussing error detection device according to claim 1, wherein said second beam divider comprises a reflector for reflecting the central light beam fraction.

7. The focussing error detection device according to claim 1, wherein said second beam divider comprises a reflector for reflecting the peripheral light beam fraction.

8. The focussing error detection device according to claim 1, wherein each of said first and second photo detectors includes two light quantity detecting elements for detecting the quantities of dually splitted light fractions, and an adder for adding the outputs from said two light quantity detecting elements to deliver the output to one of the input terminals of said subtracter.

* * * * *